(12) United States Patent
Hansen (10) Patent No.: US 7,357,706 B2
(45) Date of Patent: Apr. 15, 2008

(54) METHOD AND A PLANT FOR PREPARING SHRIMPS

(75) Inventor: Søren M. Hansen, Odense V (DK)

(73) Assignee: Cabinplant International A/S, Haarby (DK)

( * ) Notice: Subject to any disclaimer, the term of this patent is extended or adjusted under 35 U.S.C. 154(b) by 0 days.

(21) Appl. No.: 10/774,300

(22) Filed: Feb. 6, 2004

(65) Prior Publication Data

US 2004/0219871 A1    Nov. 4, 2004

(30) Foreign Application Priority Data

Feb. 12, 2003   (EP)   ................................. 03388011

(51) Int. Cl.
*A22C 29/02*   (2006.01)

(52) U.S. Cl. .................. 452/2; 452/5; 452/9

(58) Field of Classification Search .............. 452/1, 452/2, 3, 4, 5, 8, 9, 10; 99/404, 405, 407, 99/410, 443 C, 443 R, 467, 470, 567, 568, 99/569, 570, 571, 581
See application file for complete search history.

(56) References Cited

U.S. PATENT DOCUMENTS

| 2,545,517 | A | * | 3/1951 | Harris et al. ................ 209/173 |
| 2,600,867 | A | * | 6/1952 | Gerritsen ..................... 241/14 |
| 2,929,502 | A | * | 3/1960 | Harris ........................ 209/173 |
| 3,471,894 | A |   | 10/1969 | Tasker |
| 3,501,317 | A |   | 3/1970 | Veltman |
| 3,513,071 | A | * | 5/1970 | Fehmerling .................... 426/2 |
| 3,672,908 | A |   | 6/1972 | Hice, Sr. |
| 3,722,035 | A |   | 3/1973 | Hanks |
| 3,818,818 | A | * | 6/1974 | Hice, Sr. ...................... 99/330 |
| 4,038,722 | A | * | 8/1977 | Terase et al. .................. 452/1 |
| 4,111,798 | A | * | 9/1978 | Peterson et al. ......... 209/172.5 |
| 4,307,492 | A | * | 12/1981 | Braginsky et al. .............. 452/5 |
| 4,417,507 | A | * | 11/1983 | Shotwell ...................... 99/352 |
| 4,517,707 | A | * | 5/1985 | Braginsky et al. ............. 452/5 |
| 4,639,976 | A | * | 2/1987 | Hansen et al. ................ 452/8 |
| 4,769,870 | A | * | 9/1988 | Hansen et al. ................ 452/5 |
| 4,862,794 | A |   | 9/1989 | Lapeyre et al. |
| 4,916,775 | A | * | 4/1990 | Gallant ........................ 452/14 |
| 5,112,269 | A | * | 5/1992 | Petersen et al. ............... 452/5 |
| 5,156,873 | A | * | 10/1992 | Skrmetta .................... 426/510 |
| 5,928,072 | A | * | 7/1999 | Fulcher et al. ................ 452/1 |
| 6,099,400 | A |   | 8/2000 | Ragnarsson et al. |
| 6,235,338 | B1 | * | 5/2001 | Gallant et al. .............. 426/643 |

* cited by examiner

*Primary Examiner*—David Parsley
(74) *Attorney, Agent, or Firm*—Klein, O'Neill & Singh, LLP; Howard J. Klein (57) ABSTRACT

A method of preparing shrimps includes boiling them at a pressure exceeding atmospheric pressure, at a temperature exceeding the boiling temperature of water at atmospheric pressure, for keeping the meat of the shrimps in a compressed state while causing the meat to solidify and loosen from the shells of the shrimps. The shrimps are then rapidly cooled for causing the meat to be separated from the shells in an area behind the head of the shrimp and above the tail. Subsequently, the shrimps are peeled by mechanically opening the shells for allowing the meat contained within the shells to fall out. The meat is separated from the remains of the shrimps, including shell parts and eggs, by introducing the meat and remains into a separation liquid, causing the meat to float on the separation liquid while allowing the remains to sink. Finally, the meat is removed from the separation liquid.

9 Claims, 4 Drawing Sheets

Fig. 8

METHOD AND A PLANT FOR PREPARING SHRIMPS

CROSS-REFERENCE TO RELATED APPLICATION

Not Applicable

FEDERALL SPONSORED RESEARCH OR DEVELOPMENT

Not Applicable

BACKGROUND OF THE INVENTION

The present invention relates to a technique for preparing shrimps, and more specifically, a method of boiling and peeling shrimps and of separating the meat of the shrimps from the remains of the shrimps which remains include shell parts and eggs.

The preparation of shrimps such as shrimps from cold water or from hot water i.e. shrimps from the arctic ocean or alternatively the oceans in areas with a tropical, a subtropical or a temperate climate, are conventionally prepared by boiling the shrimps and separating the boiled meat from the shell part of the shrimps and optionally from any eggs carried by the living shrimps.

Originally, the technique of preparing shrimps was carried out as a manual process involving boiling the shrimps in a container including boiling water and a manual peeling and separation of the meat from the shrimps. Within the last decades, several attempts have been made at automating these previous manual processes and of providing machinery for carrying out the peeling and separation processes. Although these technical solutions have, to some extent, been acceptable and also, to some extent, commercially successful, problems still exist as to the yield of meat produced in an automated and mechanical system for peeling and separating meat from the shell parts and the eggs after the shrimps have been boiled and also as to the quality of the product. It is a requirement in relation to the peeling and separation of meat from shells of shrimps that the meat should not to any substantial extent include remains from the shells or any eggs, as the presence of shell parts or eggs in the final product deteriorates the quality.

SUMMARY OF THE INVENTION

It is therefore an object of the present invention to provide a reliable, fast and efficient technique of boiling, peeling and rinsing shrimps, in particular of providing rinsed shrimp meat from the boiled shrimps, allowing an easy separation of the meat from the shell parts and also ensuring a complete separation of eggs from the meat.

It is a further object of the present invention to provide a novel technique allowing the obtaining of an improved yield up to 5% more than the presently obtainable yield in terms of the weight percentage of meat obtained from the shrimps, thereby providing a more complete utilization of the raw material, being the shrimps to be boiled, peeled and separated into shrimp meat and remains, including shrimp shell parts and eggs.

It is a still further object of the present invention to provide a novel technique of boiling, peeling and separating shrimps into shrimp meat and remains including shrimp shell parts and shrimp eggs, which technique provides a reduced energy consumption as compared to the prior art automated and mechanical boiling, peeling and separation processes and techniques, providing a reduction of the energy consumption on the order of 25% or more.

The above objects together with numerous other objects, advantages and features, which will be evident from the detailed description below of preferred and advantageous embodiments of the technique according to the present invention, are in accordance with a first aspect of the present invention obtained by a method of preparing shrimps comprising:

a) steam boiling the shrimps at a high pressure exceeding the atmospheric pressure, and at an elevated temperature exceeding the boiling temperature of water at the atmospheric pressure for a specific period of time for keeping the meat of the shrimps in a compressed state due to the pressurization, while rapidly heating the shrimps to the elevated temperature for causing the meat of the shrimps to solidify and to loosen from the shells of the shrimps;

b) rapidly cooling the shrimps to a temperature at or below the atmospheric temperature for causing substantially all meat of the shrimps to be separated from the shells of the shrimps between an area behind the head of the individual shrimp and a part above the tail of the individual shrimp;

c) peeling the shrimps by mechanically opening the shells of the shrimps for allowing the meat loosely contained within the shells of the shrimps to fall out from the shells of the shrimps;

d) separating the meat of the shrimps from the remains of the shrimps, including the shell parts and any eggs, by flotational separation of the meat from the remains, by introducing the meat and the remains into a separation liquid such as a brine solution, including a specific amount of NaCl by weight for causing the meat to float on the separation liquid while allowing the remains of the shrimps, including the shell parts and any eggs to sink; and e) removing the meat from the separation liquid.

The method according to the present invention is characterized by two main features, namely on the one hand the steam boiling combined with the rapid cooling and the flotation separation. According to the steam boiling and rapid cooling feature, it has been realized that the steam boiling of the shrimps allows on the one hand a highly efficient and low energy-consuming boiling and on the other hand contributes to an easier peeling and separation of the meat from the remains of the shrimps. It is contemplated that the high pressure steam boiling provides a slight compacting of the meat during the boiling process, thereby providing a loosening of the meat from the surrounding shell, which loosening of the meat from the shell is further accelerated through the high temperature of the steam causing a high temperature increase, generating, due to the differences in heat expansion coefficients of the shell and the meat, a delimitation of the meat from the shell.

The loosening of the meat from the shell is further promoted through the rapid cooling as the steam-boiled shrimps, having a temperature of 150° C. or more from the highly pressurized steam boiling process, are rapidly cooled to a temperature below the atmospheric temperature, such as a temperature of 3° C.-5° C., which rapid cooling causes a contraction of the shrimp meat and also of the shell, thereby promoting the loosening and separation of the meat from the shell circumferentially encircling the meat.

The loosening or separation of the meat from the circumferentially encircling shells of the boiled shrimps makes the peeling of the shrimps easier, allowing the usage of simple peeling techniques such as mechanical compression of the shells for simply causing the shells to crack and allowing the previously boiled and rapidly cooled meat to be easily removed from the interior of the cracked shells by simply allowing the meat to fall out from the cracked or opened shells.

According to the second main feature of the technique according to the present invention, the separation of the meat from the remains of the boiled shrimps, including the shell or shell parts and any eggs, is accomplished in a flotation separation process, as it has surprisingly been realized that a flotation separation process, provided that a specific separation liquid is chosen having a specific density, allows the meat to be floating on the separation liquid, whereas the remains of the shrimps, including the shrimp shells and any eggs, are allowed to sink. Thus, it has been realized that the eggs which are carried by the living shrimps during those periods of time when the shrimps are most tasty due to the presence of enough food, may also be separated from the meat, as the eggs have a slightly higher density as compared to the boiled meat of the shrimps. It is contemplated that numerous biologically acceptable separation liquids may be used; however, according to the presently preferred embodiment, brine is used having a content of NaCl of the order of 6-14%, preferably 9.5% by weight, which separation liquid is biologically acceptable for the reason that the shrimp meat, after the completion of the boiling, cooling, the peeling and separation processes is usually salted for improving the taste of the shrimp meat. Therefore, the use of the brine solution for the flotation separation process gives no after-taste to the shrimp meat, nor does it deteriorate the taste of the shrimp meat.

As described above, the pressure of the steam boiling process has to exceed the atmospheric pressure for providing the loosening of the meat from the circumferentially encircling shell. Therefore, the pressure in step b) is preferably of the order of 4-20 bar, e.g. 6-16 bar, preferably 8-14 bar, further preferably approximately 12 bar, or of the order of 4-6 bar, 6-8 bar, 8-10 bar, 10-12 bar, 12-14 bar, 14-16 bar, 16-18 bar or 18-20 bar.

Similarly, the steam boiling temperature should, as discussed above, provide the separation of the meat from the shell, and therefore, the temperature in step a) is preferably of the order of 150° C.-250° C., such as 160° C.-210° C., preferably 180° C.-200° C. further preferably approximately 190° C., or 150° C.-170° C., 170° C.-190° C., 210° C.-230° C. or 230° C.-250° C.

According to the advantageous effect of providing a shrimp boiling process that saves energy as compared to a conventional boiling process, the steam boiling process is carried out within a very short period of time such, as a time of less than 20 sec., such as 1-15 sec., preferably 2-10 sec., further preferably 4-6 sec., or 1-2 sec., 2-3 sec., 3-4 sec., 4-5 sec., 5-6 sec., 6-8 sec., 8-10 sec., 10-12 sec., 12-14 sec., 14-16 sec. or 16-20 sec.

The loosening of the meat from the circumferentially encircling shells of the shrimps is, as discussed above, further promoted through the rapid cooling of the shrimps from the high boiling temperature, preferably being higher than 150° C., to a low temperature, such as a temperature of approximately 0° C.-20° C., e.g. 2° C.-10° C., preferably 5° C.-8° C., or 1° C.-3° C., 3° C.-5° C., 5° C.-7° C., 7° C.-10° C., 10° C.-15° C., 15° C.-20° C.

It is to be realized that the combined method according to the present invention, including the steps a)-e), may be carried out as a continuous process or alternatively as a batch or intermittent process, or it may alternatively be combined as one or more of the steps performed as batch process steps whereas the remaining steps may be carried out as continuous process steps. In particular, the boiling may be performed in a pressurised boiler in a continuous operation as the shrimps are continuously introduced into the steam boiler, and after the above short period of time removed as a continuous flow of boiled shrimps from the steam container and introduced to the rapid cooling step. Alternatively and presently preferred, the boiling is performed in a set of pressurized boilers as a semi-continuous process involving the intermittent and sequential operation of the steam boilers of the set of boilers. In particular, according to the presently preferred embodiment of the method according to the present invention, the boiling is performed in a pressurized boiler in an intermittent batch operation.

As already discussed above, the rapid cooling of the high temperature steam-boiled shrimps is preferably performed by simply sinking the boiled shrimps into a cooling bath having the above discussed temperature below the atmospheric temperature.

For improving the separation of the meat from the remains of the shrimps, including the shell parts and any eggs, the method preferably further includes a step prior to step d) of forcedly introducing the peeled shrimps into the separation liquid or alternatively stirring the peeled shrimps in the separation liquid for causing a physical separation of the meat from the remains of the shrimps, including the shell parts and any eggs, for preventing meat from sticking between shell parts or being concealed within eggs due to a compacting of the material, including the meat, the shell parts and any eggs being prevented from being rinsed before the completion of the flotation separation step.

It is to be realized that the present invention according to further aspects includes the separate steps a) in combination with steps b) (peeling) and d) (separating) of the method according to the first aspect of the present invention.

Consequently, according to a further aspect of the present invention, a method of boiling shrimps is provided comprising:

a) steam boiling the shrimps at a high pressure exceeding the atmospheric pressure, and at an elevated temperature exceeding the boiling temperature of water at the atmospheric pressure for a specific period of time for keeping the meat of the shrimps in a compressed state due to the pressurization, while rapidly heating the shrimps to the elevated temperature for causing the meat of the shrimps to solidify and to loosen from the shells of the shrimps, and b) rapidly cooling the shrimps to a temperature to or below the atmospheric temperature for causing substantially all meat of the shrimps to be separated from the shells of the shrimps between an area behind the head of the individual shrimp and a part above the tail of the individual shrimp.

According to a further aspect of the present invention, a method of separating meat from the remains of boiled shrimps, which remains include shell parts and any eggs, which method comprises:

separating the meat of the shrimps from the remains of the shrimps, including the shell parts and any eggs, by flotational separation of the meat from the remains by introducing the meat and the remains into a separation liquid such as a brine solution, including a specific amount of NaCl by weight for causing the meat to float on the separation liquid while allowing the remains of the shrimps, including the shell parts and any eggs, to sink.

The above objects together with numerous other objects, advantages and features which will be evident from the below-detailed description of preferred and advantageous embodiments of the technique according to the present invention are in accordance with a further aspect of the present invention obtained by a plant for preparing shrimps, comprising:

a) a boiler section for steam-boiling the shrimps at a high pressure exceeding the atmospheric pressure, and at an elevated temperature exceeding the boiling temperature of water at the atmospheric pressure for a specific period of time for keeping the meat of the shrimps in a compressed state due to the pressurization while rapidly heating the shrimps to the elevated temperature for causing the meat of the shrimps to solidify and to loosen from the shells of the shrimps;

b) a cooling section for rapidly cooling the shrimps to a temperature at or below the atmospheric temperature for causing substantially all meat of the shrimps to be separated from the shells of the shrimps between an area behind the head of the individual shrimp and a part above the tail of the individual shrimp;

c) a peeling section for peeling the shrimps by mechanically opening the shells of the shrimps for allowing the meat loosely contained within the shells of the shrimps to fall out from the shells of the shrimps;

d) a flotation separation section for separating the meat of the shrimps from the remains of the shrimps, including the shell parts and any eggs, by flotational separation of the meat from the remains by introducing the meat and the remains into a separation liquid such as a brine solution, including a specific amount of NaCl by weight for causing the meat to float on the separation liquid while allowing the remains of the shrimps, including the shell parts and any eggs, to sink; and e) a transfer section for removing the meat from the separation liquid.

The plant according to the present invention preferably includes any of the features discussed above with reference to the above described method according to the first aspect of the present invention.

BRIEF DESCRIPTION OF THE DRAWINGS

The present invention is now to be further described with reference to the drawings in which.

DETAILED DESCRIPTION OF THE INVENTION

Figure 1:
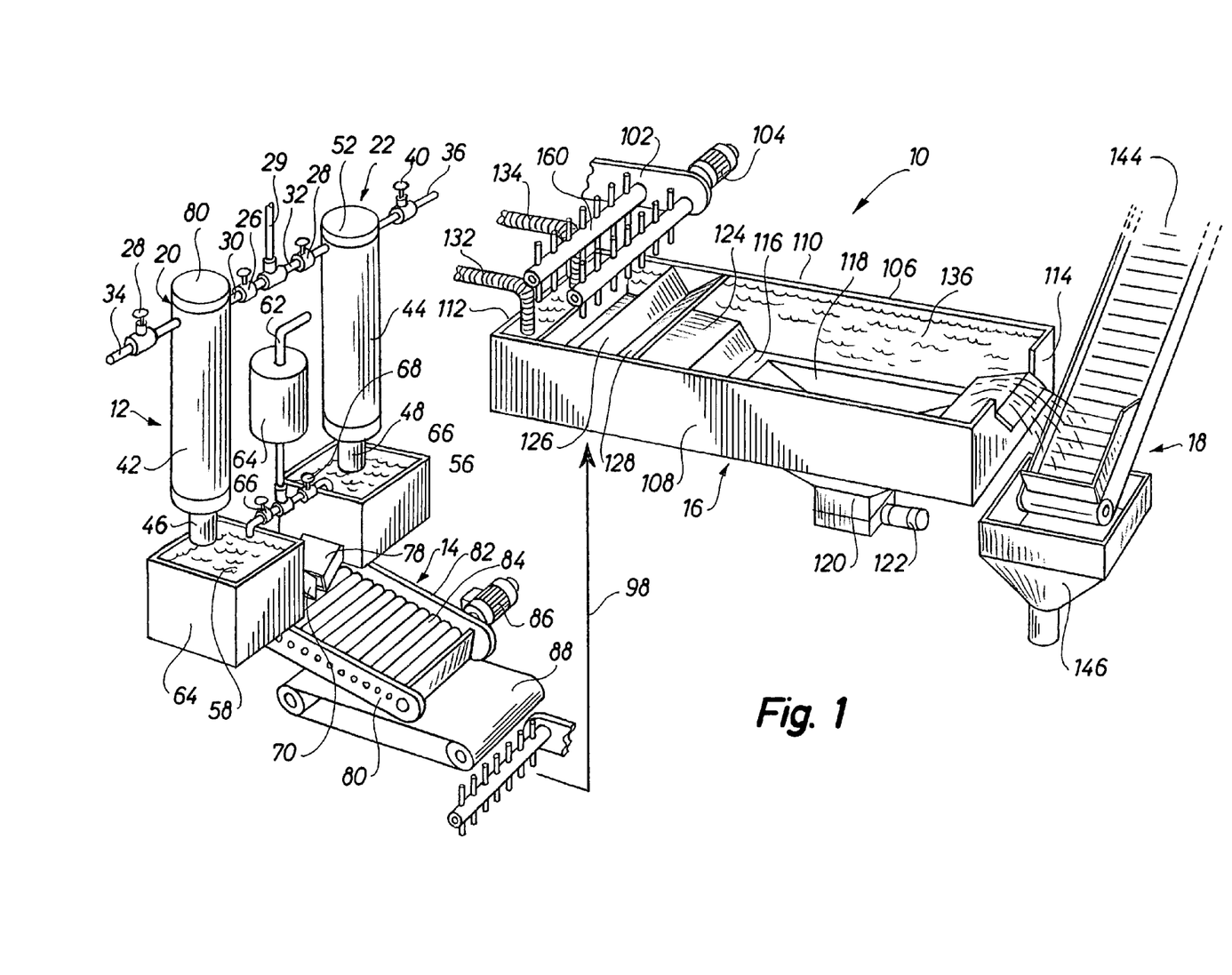
FIG. 1 is an overall diagrammatic, perspective and schematic view of a first and presently preferred embodiment of a plant, according to the present invention, for carrying out the method according to the present invention of boiling and rinsing shrimps, comprising three main sections: a boiler section, a peeling section and a rinsing and separation section.

In FIG. 1, a first and presently preferred embodiment of a plant according to the present invention for boiling, peeling, rinsing and separating shrimps according to the method of the present invention is shown, composed of a plurality of sections.

The plant is in its entirety designated by the reference numeral 10 and comprises a two-part batch boiler section 12, a peeling section 14, a rinsing and separation section 16 and finally the transfer section 18.

The individual sections 12, 14, 16 and 18 are to be described in greater detail below. At this point, however, an overall description of the plant 10 and the sections thereof is presented. In the steam boiler section 12, two steam boilers are operated intermittently for providing a substantially continuous output of boiled and rapidly cooled shrimps to the peeling section 14. In the peeling section, the boiled and cooled shrimps are peeled by breaking the shells of the shrimps for allowing the meat of the shrimps to be separated from the shells of the shrimps. In the rinsing and separation section, the meat of the shrimps is rinsed and the remains, i.e. the shrimps' shells and also the eggs of the shrimps, are separated from the meat. Finally in the transfer section, the peeled and rinsed shrimps are transferred to a further processing section, such as a packaging and freezing section, which section is not part of the present invention.

Now turning to the individual sections, the boiler section having two intermittently operated steam boilers is first to be described. One boiler is designated by the reference numeral 20, and the other boiler is designated by the reference numeral 22. The boilers receive high temperature and high pressure steam such as 12 bar, 190° C. steam from a steam supply tube 24 as the steam is input to the one boiler 20 through a closure valve 26 and similarly, the steam input to the second boiler 22 is input through a closure valve 28. The closure valves 26 and 28 are mounted on steam inlet tubes 30 and 32, respectively. The boilers 20 and 22 and vented through venting tubes 34 and 36, respectively, as the venting of the boiler chambers within the boilers 20 and 22 is controlled by means of additional closure valves 38 and 40, respectively. Each of the boilers 20 and 22 has a high pressure enclosure 42 and 44, respectively, having a bottom outlet 46 and 48, respectively. At the opposite upper ends of the boilers 20 and 22, two closure caps 50 and 52, respectively, are provided, constituting openable caps or lids through which a container including a specific amount of shrimps, such as a batch of 5-25 kg is introduced into the interior of the enclosures 42 and 44, respectively.

The bottom outlets 46 and 48 communicate with upwardly open cooling containers 54 and 56, respectively, containing cooling water as indicated by the reference numerals 58 and 60, respectively. The cooling water is input to the cooling containers 54 and 56 by means of a water supply including a water supply tube 62 and a water supply reservoir 64 from which the cooling water is poured into the cooling containers 54 and 56, respectively, through additional valves 66 and 68, respectively. As is well known in the art, the containers 54 and 56 include thermostat elements for controlling the valves 66 and 68 as the valves 66 and 68 are opened for the entry of water, provided that the temperature of the cooling water 58 and 60 or one of the container 54 and 56 rises above a specific level necessitating the additional cooling by the supply of additional cooling water.

From the bottom of the enclosures 54 and 56 two outlet ducts 70 and 72, respectively, extend for allowing the shrimps, which have been introduced into the water 58 and 60 of the cooling reservoirs 54 and 56, respectively, to be output to the peeling section 14.

In the high pressure and high temperature steam boiler described above and shown in FIG. 1, the process time for the boiling of one batch of shrimps by the supply of 12 bar, 190° C. steam is of the order of 4 sec., allowing one batch of shrimps to be boiled within a period of approximately 6-8 sec., including the time for the introduction of the batch into the boiler and the time for discharging the steam-boiled shrimps to the cooling containers 54 and 56, respectively.

Figure 8:
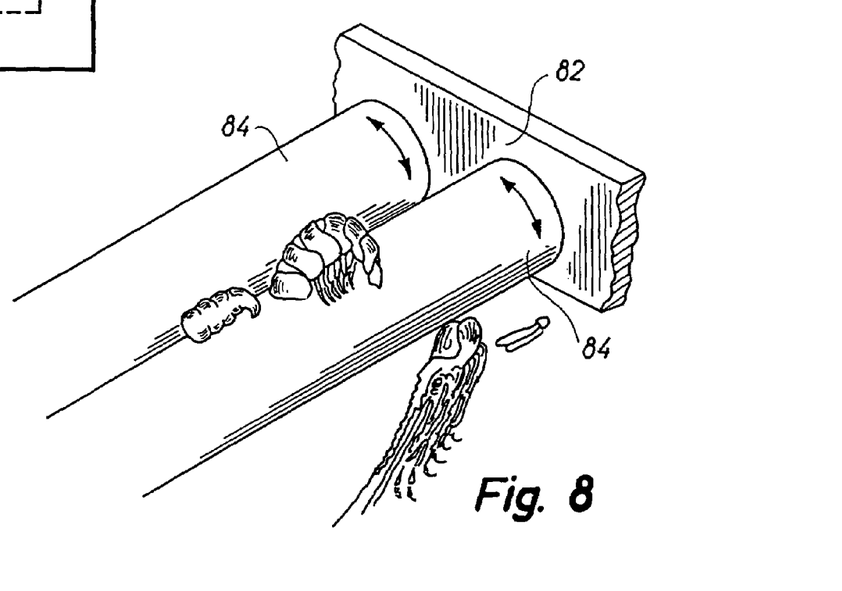
FIG. 8 is a perspective, schematic and partly broken away view illustrating in greater details the peeling section of the plant shown in FIG. 1.

The steam-boiled and cooled shrimps delivered from the outlet ducts 70 and 72 are received in the peeling section 14, including two parallel side bars 80 and 82 in which a plurality of parallel extending stainless rollers 84 are journalled and operated by means of a motor 86 causing the rollers 84 to rotate in opposite directions, as is illustrated in FIG. 8. In a specific embodiment, the rollers 84 have an outer diameter of approximately 30 mm, defining a spacing between any two adjacent rollers on the order of 1 mm, and are operated by the motor 86 to rotate at a speed of approximately 30 rpm. The rollers 84 cause the shrimps to be slightly compressed between the two oppositely rotating rollers, causing the shells of the shrimps to break as the shell of each individual shrimp has, due to the rapid boiling and rapid cooling, loosened its grip on the meat of the shrimp.

Figure 7:
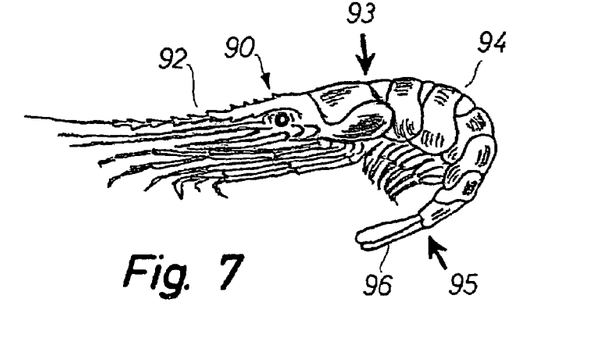
FIG. 7 is a schematic and perspective view of a shrimp illustrating those areas at which the peeling process is preferably initiated.

In FIG. 7, a shrimp 90 is shown having a head part 92, a body part 94 and a tail 96. The transition between the head part and the body part is indicated by an arrow 93 and similarly, an arrow 95 indicates the transition from the body part 94 to the tail 96. Due to the rapid boiling and rapid cooling of the shrimps, the shells constitute fairly loose encasings relative to the meat of the individual shrimps. The shell of the shrimp breaks at the above transitions indicated by the arrows 93 and 95, generally allowing an almost 100% utilization of the meat of the individual shrimp as compared to conventional techniques in which the shrimps are boiled at the atmospheric pressure and at a temperature of approximately 100° C.

In FIG. 8, a detail of the rollers 84 of the peeling section 14 is shown illustrating the peeling function of the rollers. The rollers 84 constitute revolving rollers, i.e. rollers which, in the orientation shown in FIG. 1, rotate for an extended period of time in the clockwise direction and which are periodically reversed for rotating synchronically in the counter-clockwise direction. The unpeeled shrimps are, in the clockwise direction performed by the rollers 84, caused to be brought into the gap between any two adjacent rollers, causing a crushing of the shrimps and slightly compress the boiled shrimps, thereby causing the shells to be separated from the meat. The distance between the rollers prevents the meat from falling between the rollers, whereas the shells, the shell parts, and the eggs separated from the meat of the shrimps fall between the rollers 84 onto the conveyor belt shown in FIG. 1, from which conveyor belt the separated shell parts and any eggs attached to the shell parts are disposed. The shrimp meat, and shrimp meat having attached shell parts, and any eggs attached to the shell parts are carried along by the rollers 84 and delivered from the peeling section 14 to the rinsing and separation section 16. It is to be realized that the material delivered from the peeling section 14 to the separation section 16 includes any remaining shell parts having eggs attached thereto and loose meat and further shrimp meat having shell parts attached thereto. The rinsing and separation section 16 is physically mounted below the conveyor belt 88; however, in FIG. 1, as indicated by an arrow 98, the rinsing and separation section 16 is, for illustrative purposes, positioned above the conveyor belt 88.

In the rinsing and separation section 16, the shrimp meat is rinsed from any shell parts or eggs adhering to the meat and further separated from the shells and the eggs. The material, including the shrimp meat, the shell or shell parts, and the shrimp eggs, is delivered from the output end of the conveyor belt 88 to a set of rotating agitators 100 which are journalled in two parallel side bars, one of which is shown in FIG. 1 and designated the reference numeral 102, and which are rotated in opposite directions by means of a motor 104. Basically, the agitators 100 are operated similar to the rollers 84 of the peeling section 14; however, the agitators 100 are positioned in spaced apart relationship allowing the material after the mechanical agitation to be delivered into a separation bath of a separation container 106. The container 106 is composed of two opposite side walls 108 and 110, a front wall 112 and an end wall 114. The container also has a bottom wall 116 in which an outlet funnel 118 is provided, which funnel communicates with a bottom pump assembly 120 from which the shell parts and the shrimp eggs are delivered to an outlet tube 122. Between the two side walls 108 and 110, a chute wall 124 extends from below two downwardly protruding V-defining walls 126 and 128 to the funnel 118 for guiding the shell parts and the shrimp eggs to the bottom outlet funnel 118.

Within the separation container 106, brine 130 is contained, including approximately 9.5% NaCl by weight for providing a flotation separation of the shrimp meat from the remains of the shrimps, including the shell parts and the shrimp eggs. It has surprisingly been realized that a specific separation threshold exists, allowing the shrimp meat to be separated from the remains of the shrimps, namely the shrimp shells and the shrimp eggs. The brine is input to the separation container through two brine inlet tubes 132 and 134, and the brine is allowed to float out from the separation chamber 106 at an outlet opening in the rear wall 114 as the brine carrying the shrimp meat is allowed to fall down into the transportation section 18.

Figure 2:
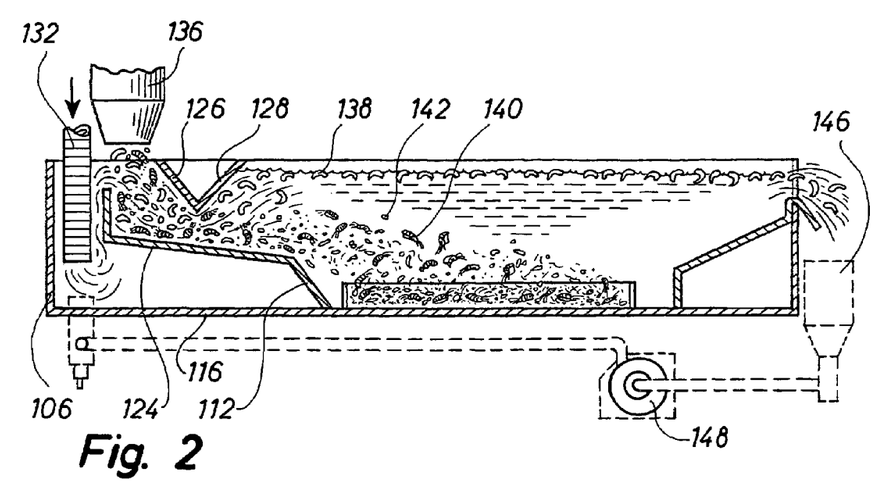
FIG. 2 is a vertical sectional view of the rinsing and separation section shown in FIG. 1.

In FIG. 2, a vertical sectional view of the separation container 106 is shown, in which the shrimps, including the shrimp meat, the shrimp shells, and the shrimp eggs, are introduced into the separation container through a delivery funnel 136 rather than by means of the agitators 100 shown in FIG. 1.

As the brine is introduced through the tube 132, the water is forced upwardly along a vertical wall part of the chute wall 124 carrying along the material input through the funnel 136 and including the shrimp meat, the shrimp eggs, and the shrimp shells. The material carried along with the brine is forced downwardly below the two V-defining walls 126 and 128 providing a steering effect for separating the constituents from one another and allowing the rinsed and cleaned shrimp meat parts 138 to float on top of the brine, whereas the shell parts 140 and the eggs 142 sink to the bottom of the separation container 106, allowing the shrimp shell parts 140 and the shrimp eggs 142 to deposit in the outlet funnel 118 of the separation container, from which outlet funnel (shown in FIG. 1), the waste material, i.e. the shrimp shell parts 140 and the shrimp eggs 142, is output through the outlet 122 shown in FIG. 1.

After the flotation separation process has been completed, the brine carrying the shrimp meat parts 138 is output from the rear end of the separation container, i.e. opposite to the inlet end at which the brine inlet 132 and the funnel 136 are positioned, and transferred to the transport section 18.

In the transport section 18 shown in FIG. 1, a conveyor belt 144, which constitutes a filtering conveyor belt, carries the shrimp meat parts to the packaging and freezing section (not shown in the drawings), whereas the brine is expelled to a bottom funnel 146, from which the brine may be discarded, or alternatively, as shown in FIG. 2, recirculated to the inlet end of the separation container by means of a pump 148 delivering the recirculating brine to the inlet end of the separation container 106.

The technique of removing the waste, i.e. the shell parts 140 and the eggs 142, from the flotation separation container 106 may be accomplished in numerous ways as an intermittent operation or a continuous operation.

Figure 3:
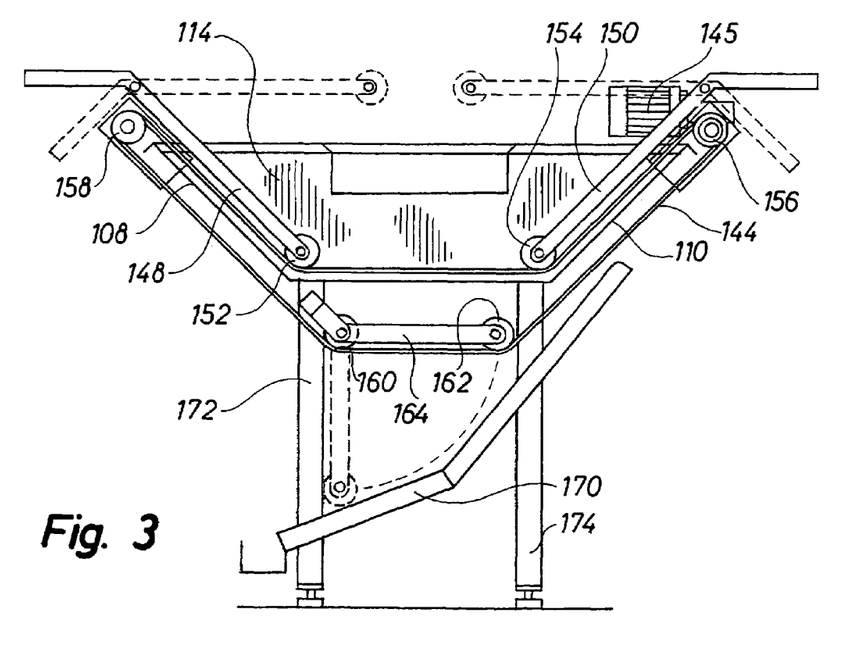
FIG. 3 is an elevational end view of an alternative embodiment of the rinsing and separation section shown in FIGS. 1 and 2.

In FIG. 3, a modified embodiment of the separation container is shown, differing from the above described first and presently preferred embodiment shown in FIGS. 1 and 2, in that the side walls 108 and 110 constituting vertical side walls in FIG. 1 are substituted by sloping side walls 108' and 110'. In a transverse direction relative to the separation container 106, a belt 144 extends, which belt is driven by a motor 145. The belt is forced down into contact with the inner surface of the separation container 106 by means of two pressure arms 148 and 150 carrying pressure rollers 152 and 154, respectively. As the pressure rollers are in their lowermost operational position shown in solid outline in FIG. 3, the bottom part of the belt 144 is raised, as illustrated in solid outline in FIG. 3. The belt 144 passes around a drive roller 156 connected to the drive motor 145 and around an idler roller 158 positioned symmetrically relative to the drive roller 156, as the drive roller 156 is positioned above the sloping side wall 110', whereas the idler roller 158 is positioned above the sloping side wall 108'.

The bottom part of the belt 144 is guided around two rollers 160 and 162 which are interconnected by means of a spacing bar 164. Below the lower part of the belt contacting the rollers 160 and 162, a sloping rinsing wall 170 is positioned, which rinsing wall 170 is fixed to supporting legs 172 and 174 of the rinsing and separation section 16.

As shrimp shells and shrimp eggs are collected on the part of the belt 144 positioned between the two pressure rollers 152 and 154, and while the flotation separation process is performed, the collected quantity of shrimp shells and shrimp eggs needs, after a period of time, to be removed. The removal of the shrimp shells and shrimp eggs in the modified embodiment shown in FIG. 3 is accomplished by simply raising the pressure arms 148 and 150 from the solid outline positions shown in FIG. 3 to the dotted outline positions, allowing the belt 144 to be raised, and by operation of the motor 145 driving the belt by means of the drive pulley 156, the waste material is carried by the belt around the roller 158 and is delivered to an outlet passage connected to the separation wall 170 against which the belt is pressed for mechanically rinsing the belt as the lower part of the belt 144 is lowered into contact with the sloping rinsing wall 170 as the bar 164 swings downwardly, as is illustrated in dotted outline in FIG. 3.

Figures 4, 5:
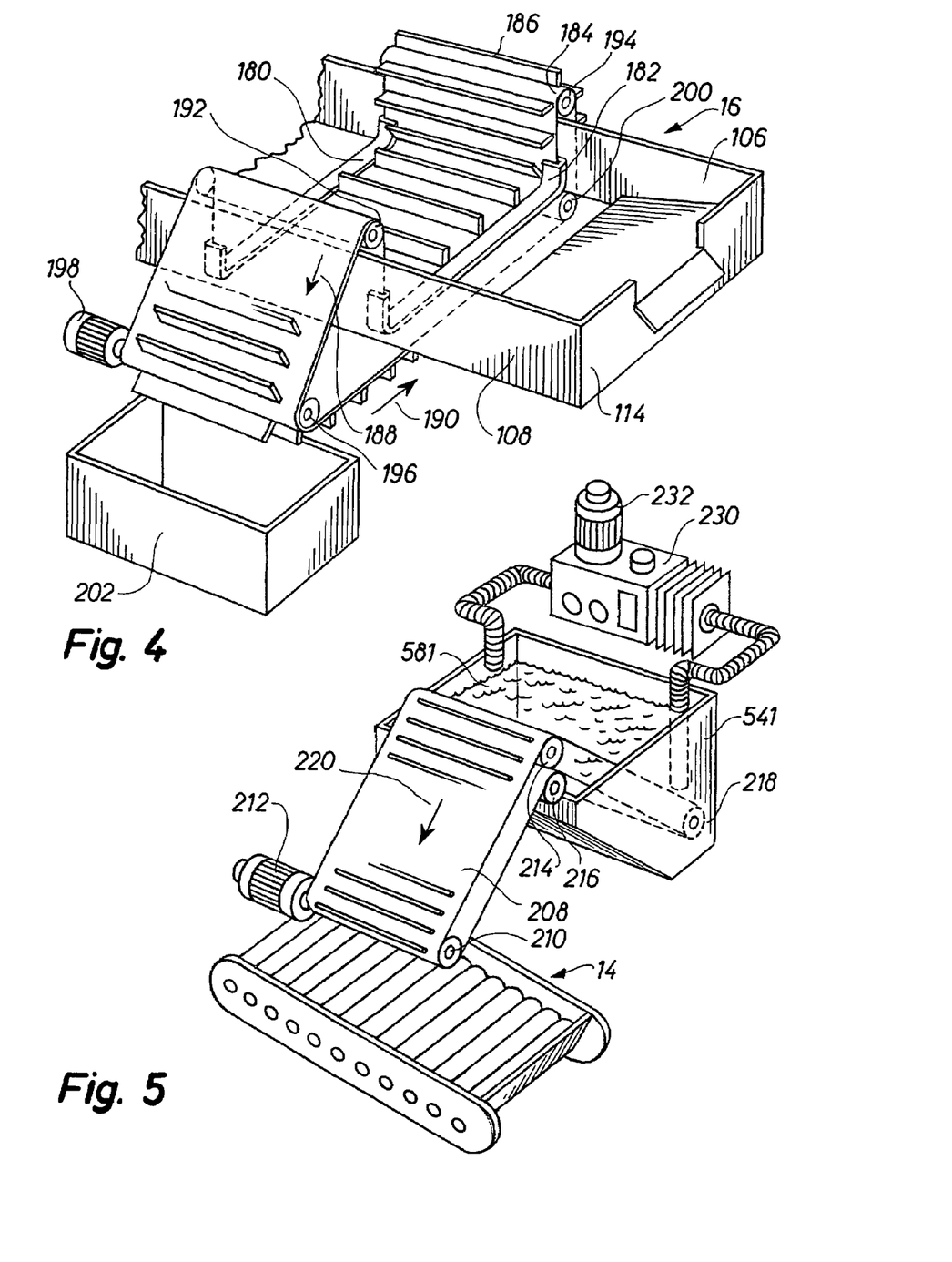
FIG. 4 is a perspective, schematic and partly broken away view of an alternative embodiment of the rinsing and separation section shown in FIGS. 1-3.
FIG. 5 is a perspective and schematic view of a modified embodiment of the boiler section shown in FIG. 1, including a transfer section for the transfer of boiled shrimps from the boiler section to the peeling section.

In FIG. 4, a further modified embodiment of the separation container 106 is shown in which a transverse conveyor is used for the removal of shrimp shells and shrimp eggs from the bottom of the separation container 106. In FIG. 4, two guide rails 180 and 182 are provided in which a transverse conveyor belt 184 is guided transversely relative to the longitudinal direction of transportation of brine through the separation container 106. The conveyor belt 184 is provided with outwardly protruding carrier plates 186 by means of which the shrimp shells and shrimp eggs are lifted along the side wall 108 of the separation container 106 as the conveyor belt 184 is moved in the direction indicated by two arrows 188 and 190 in FIG. 4. The conveyor belt 184 is guided through the guide rails 180 and 182 and further around two top rollers 192 and 194 and further around a drive roller 196 powered by a motor 198 and around a bottom idler roller 200. Between the top rollers 192 and the drive roller 196, the conveyor belt 184 defines a sloping surface from which the shrimp shells and the shrimp eggs carried by the conveyor belt are thrown into a waste container 202.

Apart from the above described techniques of removing the waste material, i.e. the shrimp shells and the shrimp eggs, from the separation container 106 by means of a bottom funnel, a transverse, periodically-operated belt and a continuous operated belt having carried plates, numerous other removal techniques are obvious to a person having ordinary skill in the art and are contemplated to be part of the present invention as defined in the appending claims.

In FIG. 5, a modified cooling enclosure 54' is shown in which a sloping conveyor is used for the removal of the steam-boiled and rapidly cooled shrimps from the cooling water 58', which conveyor belt is designated the reference numeral 208 and is passed around a drive roller 210 powered by a motor 212 and a total of three idler rollers 214, 216, and 218 as the belt is moved in the direction indicated by an arrow 220 for the transfer of the steam-boiled and rapidly cooled shrimps to the peeling section 14 positioned below the drive roller 210 of the conveyor assembly including the conveyor belt 208.

Rather than a cooling water supply tube, as illustrated in FIG. 1, the cooling enclosure 54' shown in FIG. 5 is provided with a recirculation circuit in which a cooling apparatus 230 is included having an internal pump 232 for the circulation of the cooling water through the cooling apparatus 230 and for the delivery of the cooling water to the cooling enclosure 54'. The cooling of the water is accomplished by means of a conventional cooling compressor circuit having a cooling compressor, an evaporator, etc. as is well known in the art per se.

Figure 6:
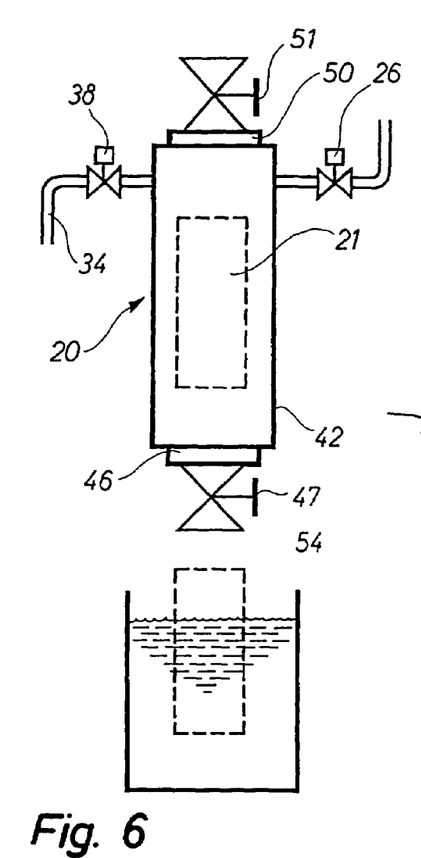
FIG. 6 is a schematic and sectional view of a boiler of the batch steam boiler section shown in FIG. 1.

In FIG. 6, one of the two batch steam boilers 20 and 22 is shown in schematic view, illustrating the interior of the boiler in which the shrimp batch is included in a container 21 which is heated by means of steam input through the closure valve 26 as the batch container 21 is introduced into the interior of the enclosure 42 by opening a cap 50 by means of a thumb wheel 51. From the bottom outlet 46, the batch container 21 is delivered to the cooling water 54 by the opening of the bottom outlet by means of a thumb wheel 47.

Although the technique of steam boiling shrimps and rapidly cooling the shrimps for the loosening of the shrimp shell from the shrimp meat, the peeling of the shrimps by means of solid stainless steel rollers and finally the flotation separation technique according to the present invention has been described with reference to specific and presently preferred embodiments, the present invention is by no means limited to the above described embodiments, techniques or alternatives, as numerous modifications and alterations are to be considered obvious to a person having ordinary skill in the art without deviating from the true spirit and scope of the invention as defined in the appending claims.

The invention claimed is:

1. A method of separating the meat of egg-bearing shrimps from the shells and eggs of said shrimps, comprising the following steps:
   a) steam boiling said shrimps at a high pressure exceeding the atmospheric pressure, and at an elevated temperature exceeding the boiling temperature of water at the atmospheric pressure for a specific period of time for keeping the meat of said shrimps in a compressed state due to the pressurization, while rapidly heating said shrimps to said elevated temperature for causing the meat of said shrimps to solidify and to loosen from the shells of said shrimps;
   b) rapidly cooling said shrimps to a temperature at or below the atmospheric temperature for causing substantially all meat of said shrimps to be separated from the shells of said shrimps between an area behind the head of each individual shrimp and a part above the tail of each individual shrimp;
   c) peeling said shrimps by engaging the shells with rollers to open the shells of the shrimps for allowing the meat loosely contained within the shells of said shrimps to fall out from the shells of said shrimps;
   d) separating the meat of said shrimps from the shell parts and eggs of the shrimps, by flotational separation of the meat from said shell parts and eggs, by introducing the meat with the shell parts and eggs attached thereto into a brine solution, including 6-14% NaCl by weight, for causing the meat to float on said brine solutions, while allowing the shell parts and eggs to sink; and
   e) removing the meat from said brine solution.

2. The method according to claim 1, said pressure in step a) being in the range of 4-20 bar.

3. The method according to claim 1, said temperature in step a) being in the range of 150° C.-250° C.

4. The method according to claim 1, said specific period of time in step a) being less than 20 sec.

5. The method according to claim 1, said temperature in step b) being in the range of 0° C.-20° C.

6. The method according to claim 1, said boiling being performed in a pressurized boiler in a continuous operation.

7. The method according to claim 1, said boiling being performed in a pressurized boiler in an intermittent batch operation.

8. The method according to claim 1, said rapid cooling being performed by introducing said boiled shrimps into a water cooling bath.

9. The method according to claim 1, further including, prior to step d), a step selected from the group consisting of forcedly introducing said peeled shrimps into said brine solution and stirring said peeled shrimps in said brine solution for causing a physical separation of the meat from the shell parts and eggs.

\* \* \* \* \*